United States Patent [19]
Skaer

[11] Patent Number: 5,273,075
[45] Date of Patent: Dec. 28, 1993

[54] DIVERTER VALVE

[75] Inventor: Richard A. Skaer, Ventura, Calif.

[73] Assignee: ITT Corporation, New York, N.Y.

[21] Appl. No.: 36,776

[22] Filed: Mar. 25, 1993

[51] Int. Cl.⁵ ............................................. F16K 11/00
[52] U.S. Cl. .................................. 137/883; 137/886
[58] Field of Search ...................... 137/872, 883, 886

[56] References Cited

U.S. PATENT DOCUMENTS 4,221,361 9/1980 Weingarten ................. 137/883 X
5,065,794 11/1991 Cheung ........................ 137/883

Primary Examiner—John C. Fox
Attorney, Agent, or Firm—Menotti J. Lombardi

[57] ABSTRACT

A diaphragm type valve with a single inlet port and two outlet ports in which the flow of fluids can be directed from the inlet port to one or the other outlet ports.

11 Claims, 4 Drawing Sheets

DIVERTER VALVE

BACKGROUND OF THE INVENTION

This invention relates to diaphragm valves and more particularly to a diaphragm valve with a single inlet port and two outlet ports.

It is often necessary in fluid process piping systems to divert the flow of fluid from one stream to another. This can be accomplished through the use of a diverter (three way) valve or using two valves connected to each other through a tee or wye branch fitting. At this time, there does not exist a diverter valve in a weir style hermetically sealed configuration which can accomplish this end. The current practice then is to use two weir style diaphragm valves connected with a tee or wye as described above. The problem in such an arrangement, in addition to the more installation space required, is that fluid will stagnate, contaminants will accumulate, or micro-organisms will grow in the branch flow passage when the valve connected to that passage is closed. These same conditions can occur when the valve connected to the wye or tee pipe line is closed and the fluid diverted through the branch passage.

Accordingly, the problem of eliminating dead legs which contribute to the accumulation of contaminants and growth of micro-organisms is overcome by the diverter valve of the invention.

SUMMARY OF THE INVENTION

An object of the invention is to provide a diaphragm valve for diverting the flow of fluids from a single branch port to one or the other of two branch ports.

According to the broader aspects of the invention, the diaphragm valve is configured so as to direct the flow of fluid coming from the inlet port into a single chamber and then from this chamber across one of two weirs located at opposite ends of the chamber through to a corresponding outlet port.

BRIEF DESCRIPTION OF THE DRAWINGS

Other objects, aspects, and features of the invention will become more fully apparent from the following detailed description of the preferred embodiment, the appended claims, and the accompanying drawings in which:

DETAILED DESCRIPTION OF THE PREFERRED EMBODIMENT

Figure 1:
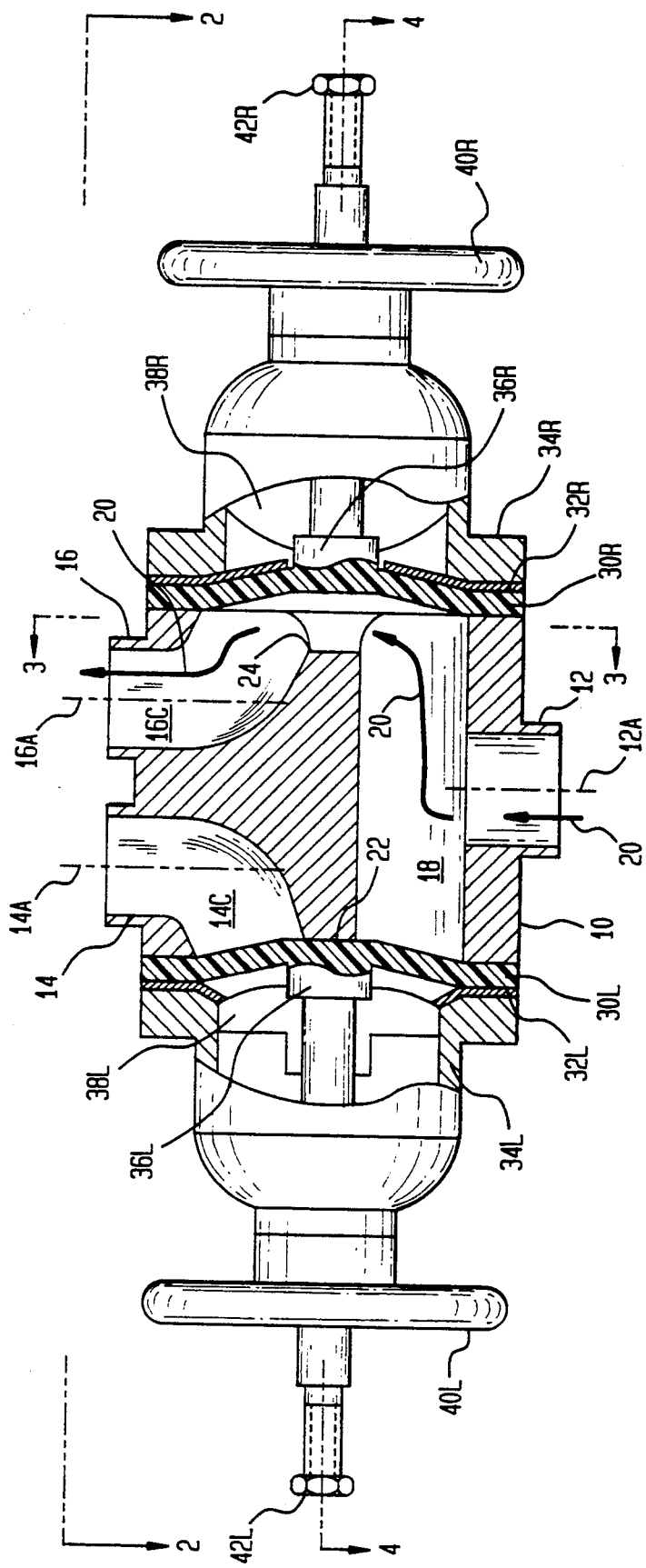
FIG. 1 is a partial cross-sectional view of the diverter valve according to the invention.

Referring to FIG. 1, there is shown a unitary formed valve body 10, which may be cast or machined from iron, bronze, or stainless steel, or molded from a suitable plastic or plastic composite material. The body 10 has a single inlet port 12 which is preferably centrally located on one side in the body. The body 10 also has two outlet ports 14, 16 located on an opposite side from the inlet port. The central axis 14a, 16a of the outlet are equally spaced from the central axis 12a of port 12. The ports 12, 14, 16 may be threaded, flanged, or left smooth for welding, depending on the desired coupling to the process piping.

A single chamber 18 extending the length of body 10 is formed adjacent port 12 to permit unobstructed fluid flow into and through the chamber 18. The flow, represented by arrows 20, from port 12 through chamber 18 is directed across one of two weirs 22, 24 at opposite ends of chamber. Depending on the open o closed condition of the diaphragm against a weir, the flow then exists through smooth and unobstructed channels 14c or 16c of ports 14, 16 respectively.

For illustrative purposes, diaphragm 30L is shown in the closed position against weir 22 and diaphragm 30R is shown in the open position away from weir 24 to permit the fluid flow as represented by arrows 20. The diaphragms 30L, 30R are the same and may be made of an elastomer or TFE material. Steel or stainless steel finger plates 32R, 32L are positioned between the diaphragms 30R, 30L and bonnets 34R, 34L which may be cast or machined from metal such as iron, bronze, steel, stainless steel or molded from a suitable plastic material. The finger plates may be individual elements as shown or formed as part of the bonnet member.

Compressors 38R, 38L are mounted to stems 36R, 36L respectively. The stems 36R, 36L which are coupled to diaphragms 30R, 30L, extend through the bonnets and have respectively mounted thereon handwheels 40R, 40L. The stems include fixing nuts 42R, 42L. Typically the compressor is made of aluminum, bronze, zinc, iron or coated iron, and the stem is made of steel or stainless steel. The handwheel is normal iron or coated iron, but may be made of a suitable plastic or plastic composite material. It should also be noted that although a handwheel is shown, other means such as pneumatic or electrical actuators may be mounted to move the stems.

Figure 2:
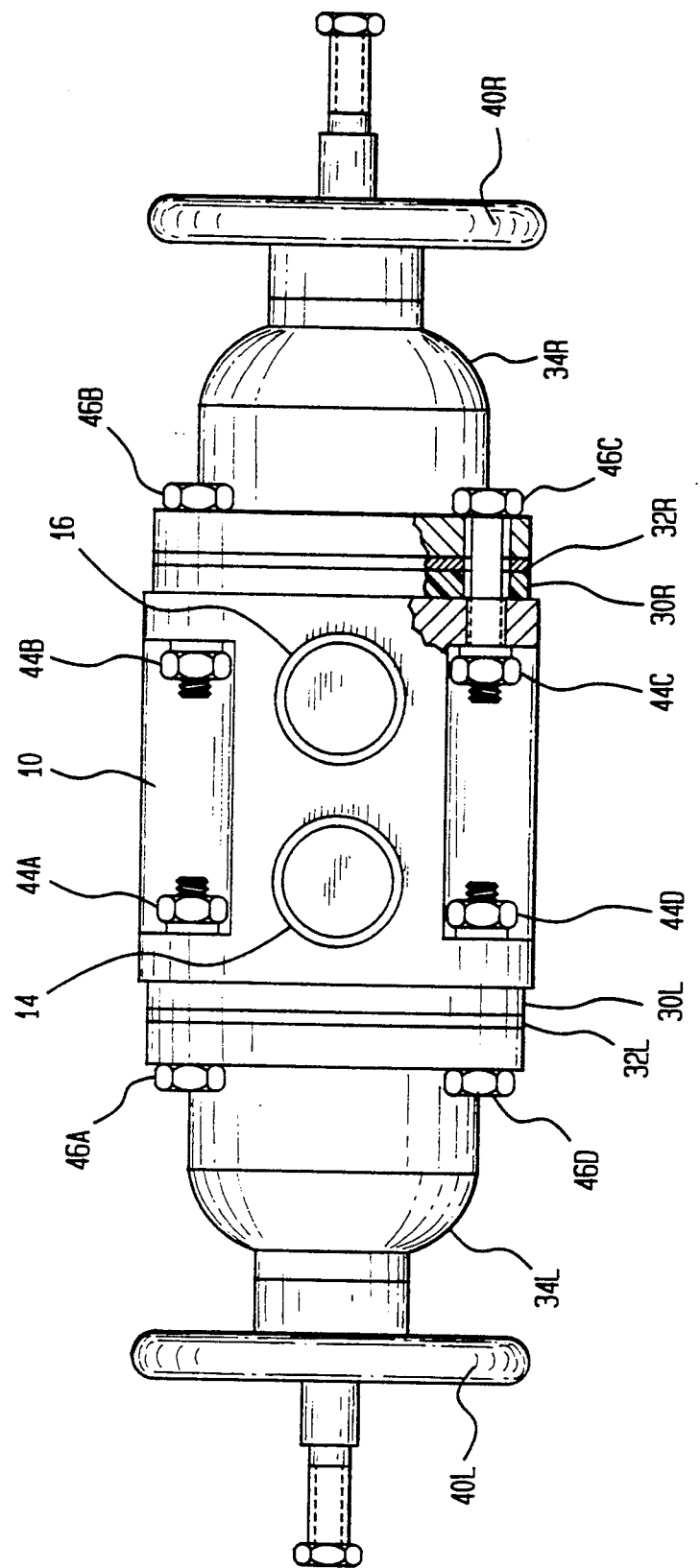
FIG. 2 is a top view taken along line 2—2 of FIG. 1 with a partial cross-sectional view of a corner of the valve.

Referring now to FIG. 2, there is shown a top view of the diverter valve taken along line 2—2 of FIG. 1 with a partial cross-sectional view of a corner of the valve to illustrate the bolt and nut coupling arrangement. As illustrated, the valve body 10 has two outlet ports 14, 16, and mounted to the body are the bonnets 34R, 34L with the associated handwheels 40R, 40L. Fixed between the bonnets and end faces of the valve body are the diaphragms 30R, 30L and finger plates 32R, 32L. The assembly is held together by eight nuts and bolts; only four are shown in FIG. 2, nuts 44a, b, c, and d, and bolts 46a, b, c, and d. The other four nuts and bolts are positioned on the opposite side of the valve assembly shown.

Figure 3:
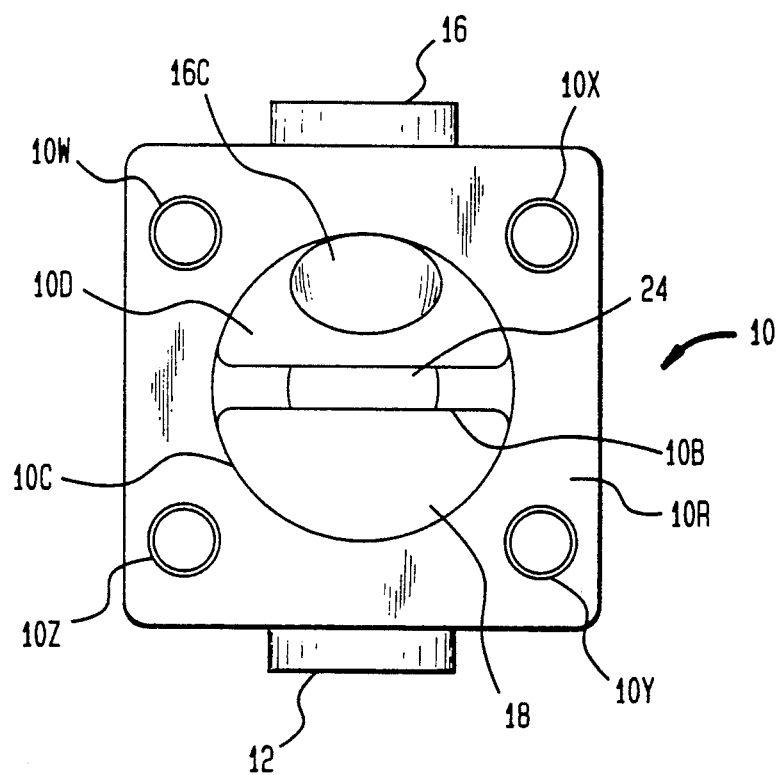
FIG. 3 is a planar end view of the valve body taken along line 3—3 of FIG. 1.

In FIG. 3, there is shown a planar end view of the valve body taken along line 3—3 of FIG. 1. The valve body 10 has a flat end face 10R and a centrally positioned opening 10C which is bisected by the weir 24. Valve Body surface 10b extends the length of the central chamber 18 and body surface 10d is curved to form outlet channel 16c connected to outlet port 16 The smooth unobstructed chamber 18 and channel 16 permit flow of fluids which enter port 12 into channel 18 over weir 24, into channel 16c and out port 16. The holes 10w, x, y and z, in end face 10R of the valve body are for locating mounting bolts therethrough.

Figure 4:
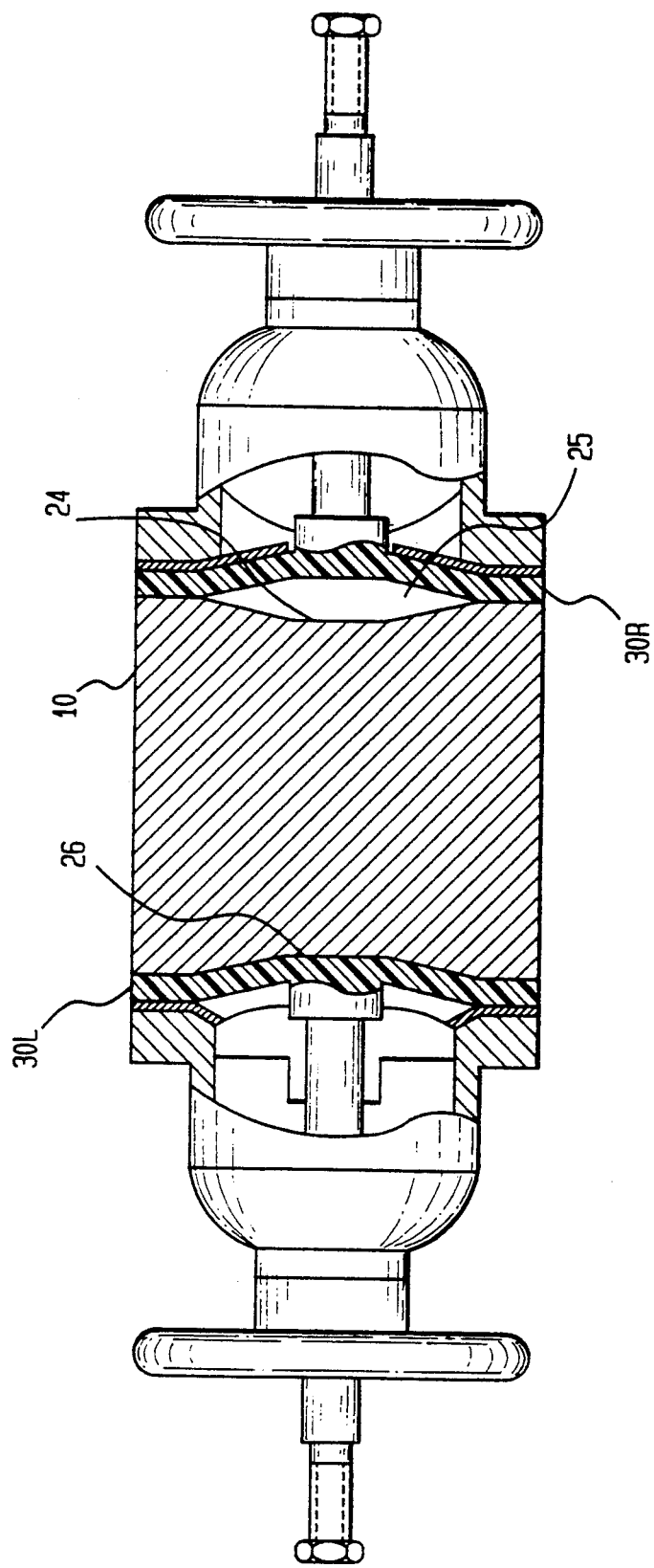
FIG. 4 is a view taken along line 4—4 of FIG. 1 with the valve body shown in cross-section.

Referring additionally to FIG. 4, the cross-sectional view of the valve body 10 is shown. As shown and described in connection with FIG. 1, the diaphragm 30R is shown away from weir 24 with a passage area 25 created between weir 24 and open diaphragm 30R permitting fluids to flow over the weir. The oppositely located diaphragm 30L is shown closed or shut against weir 22. Thus through the use of a manual or other actuating closing means, the selected diaphragm will close off one or the other passage areas. This configuration assures a flow of uniform quality and consistency when diverting fluid from one outlet port to the other outlet port. Since the chamber 18 is common to both outlet weirs, the fluid being piped into the inlet port will sweep and flush out the chamber preventing stagnation and opportunity for contaminants or particulates to accumulate and/or growth of microorganisms to develop as could occur in biologic process streams.

While the present invention has been disclosed in connection with a preferred embodiment thereof, it should be understood that there may be other embodiments which fall within the spirit and scope of the invention as defined by the following claims.

What is claimed is:

1. A diverter valve comprising:

a unitary formed valve body;

an inlet port and a chamber located on one side of said body adjacent said inlet port and extending the length of said body;

first and second weirs located at opposite ends of said body and chamber;

first and second outlet ports being located in said body on a side opposite said inlet port, each said ports being centrally displaced on either side of the axis of said inlet port;

said first and second outlet ports having associated first and second channels formed in said body an directed toward said first and second weirs respectively;

said body having first and second end faces parallel to said first and second weirs and perpendicular to the axis of each said inlet and outlet ports; and first and second diaphragms mounted to said first and second end faces of said body for selectively engaging one said associated first and second weirs, such that when said first diaphragm is closed against said first weir, fluid flow is prevented from said chamber to said first channel and outlet port, and when said second diaphragm is open and away from said second weir, fluid flow is directed from said chamber over said second weir and through said second channel and outlet port.

2. The diverter valve according to claim 1 including:

first and second stem means respectively coupled to said first and second diaphragms; and first and second bonnets for mounting respectively therein said first and second stems.

3. The diverter valve according to claim 2 including:

first and second actuator means mounted respectively on said first and second bonnet means for engaging and moving said first and second stem means to effect corresponding movement of said first and second diaphragms against or away from the respective first or second weir.

4. A diverter valve for fluids comprising:

a valve body having a chamber extending therethrough and an inlet port connected to said chamber;

a first weir located at a first end of said body transverse to said chamber and formed between said chamber and a first channel and exit port in said body;

first operating means including a first diaphragm movable toward and away from said first weir, such that when said first diaphragm is positioned against said first weir, said chamber and first channel and exit port are isolated to prevent fluid flow therebetween;

a second weir located at a second end of said body opposite said first end and transverse to said chamber, said second weir formed between said chamber and a second channel and exit port in said body;

second operating means including a second diaphragm movable toward and away from said second weir, such that when said second diaphragm is positioned against said second weir, said chamber and said second channel and exit port are isolated to prevent fluid flow therebetween.

5. The diverter valve according to claim 4 wherein when said first diaphragm is positioned away from said first weir, said inlet port and chamber is in fluid connection with said first channel and exit port; and when said second diaphragm is positioned away from said second weir, said inlet port and chamber is in fluid connection with said second channel and exit port.

6. A valve for diverting the flow of fluids from a single inlet port to one or the other of two outlet ports comprising:

a unitary formed valve body defining a through chamber connected to said inlet port;

said body having at a first end a first channel connected to a first outlet port, and a first weir formed between said chamber and said first channel;

a first closure means for selectively sealing against said first weir to prevent fluid communication between said chamber and said first channel;

said body having at a second end opposite said first end a second channel connected to a second outlet port, and second weir formed between said chamber and said second channel; and a second closure means for selectively sealing against said second weir to prevent fluid communication between said chamber and said second channel.

7. The valve of claim 6 wherein said first closure means includes a first diaphragm which is sealingly secured to the first end of said body for sealing against said first weir in one position and, in another position, away from said first weir forms the wall of a first passage permitting fluid flow between said chamber and said first channel.

8. The valve of claim 7 wherein said second closure means includes a second diaphragm which is sealingly secured to the second end of said body for sealing against said second weir in a first position and, in a second position away from said second weir forms the wall of a second passage permitting fluid flow between said chamber and said second channel.

9. The valve of claim 8 including first and second activating means for selectively moving said first and second diaphragms into sealing engagement with said first and second weirs respectively.

10. The valve of claim 9 wherein said first and second outlet ports are located on a side opposite said inlet port, and each said outlet ports being centrally displaced on either side of the axis of said inlet port.

11. The valve of claim 10 wherein said valve body having first and second end faces parallel to said first and second weirs and perpendicular to the axis of each said inlet and outlet ports.

* * * * *